Nov. 9, 1948.    E. W. HUEBNER    2,453,320
WELDING ELECTRODE HOLDER
Filed July 26, 1946
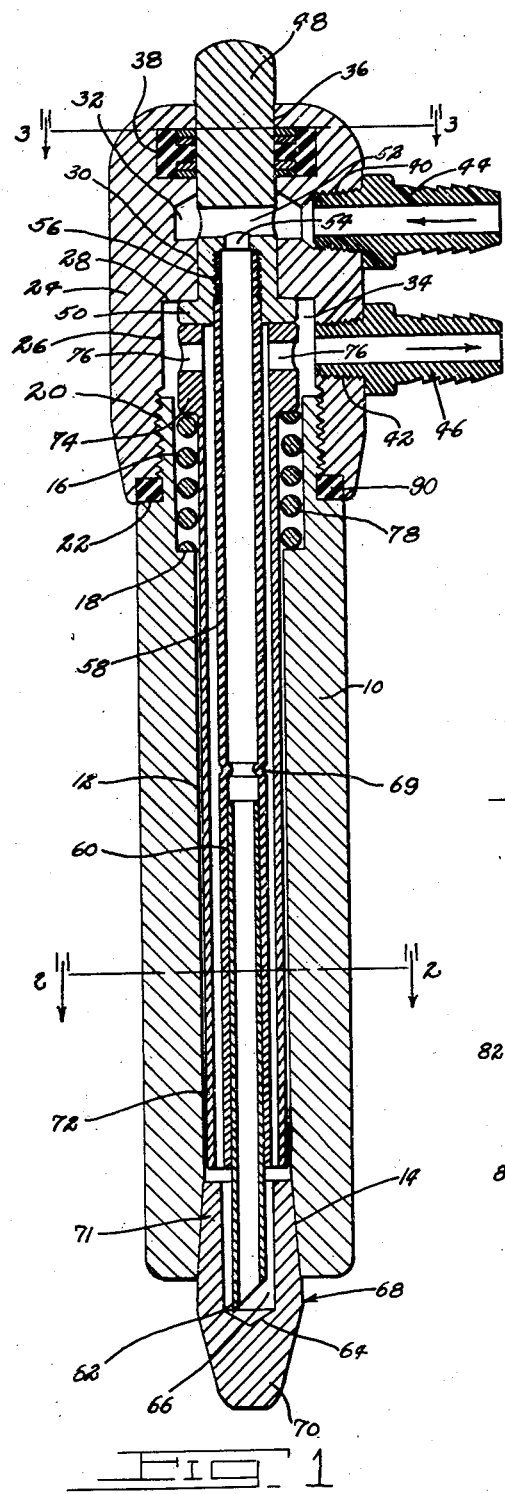
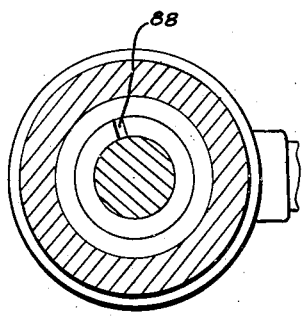
Fig. 3
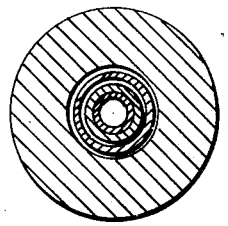
Fig. 2
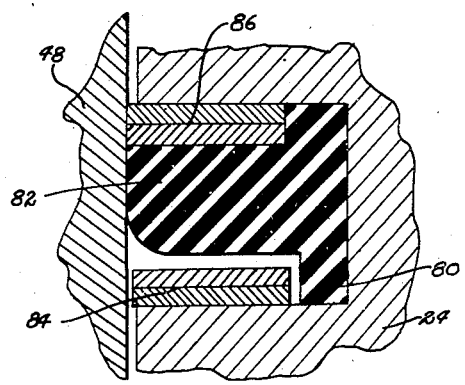
Fig. 4
Fig. 1
INVENTOR.
Ernest W. Huebner
BY
LaRue W. Oates
ATTORNEY Patented Nov. 9, 1948

2,453,320

UNITED STATES PATENT OFFICE 2,453,320

WELDING ELECTRODE HOLDER

Ernest W. Huebner, Detroit, Mich., assignor to Weiger Weed & Company, Detroit, Mich.

Application July 26, 1946, Serial No. 686,263

9 Claims. (Cl. 219—4)

This invention relates to improvements in welding electrode holders and more particularly to a water cooled holder having a removable electrode tip.

In welding electrode holders, it is important to provide a cooling system for both the holder and the electrode tip. The tips are usually replaceable and it is desirable to provide knockout means for removing the tip. In the form of the invention herein illustrated, the knockout means has been shown in conjunction with the cooling system and it becomes necessary to provide accurate sealing means between the relatively movable parts.

It is an object of the present invention to provide an improved sealing means between a reciprocating, knockout member and the cooling system whereby a cooling medium is confined within the device for cooling the holder and the removable tip.

Another object of the invention is to provide resilient means for maintaining the knockout means in a predetermined normal position.

A further object of the invention is to provide supporting guides at the opposite sides of the sealing member for stabilizing the axially movable knockout member.

A still further object of the invention is to provide a fluid seal between relatively movable parts which forms a dividing wall between inlet and outlet fluid passages.

Other objects and advantages of the invention will more fully appear from the following description taken in connection with the accompanying drawings, in which:

Fig. 1 is a longitudinal sectional view of a welding electrode tip holder illustrating a preferred form of the invention;

Fig. 2 is a sectional view taken on line 2—2 of Fig. 1;

Fig. 3 is a sectional view taken on line 3—3 of Fig. 1; and

Fig. 4 is an enlarged sectional view of the fluid sealing means shown in Fig. 1.

Referring to the drawings, there is shown a tubular body member 10 having a bore 12 extending therethrough and an inwardly tapered recess 14 at one end thereof with the outer end of the tapered recess 14 having a larger diameter than the bore 12. The opposite end of the bore 12 is counterbored at 16 providing a shoulder 18. The outer periphery of the counterbored end of the body 10 is of reduced diameter and has external screw threads 20. The reduced diameter provides a shoulder 22.

Screw threaded on the threads 20 is a head 24 having internal threads at one end of a bore 26. The bore 26 terminates longitudinally in a shoulder 28 surrounding a reduced bore 30 communicating with an inlet chamber 32. A chamber 34 is provided between the internal threads and the shoulder 28. The outer end of the head is provided with a bore 36 axially aligned with the bore 30. A channel groove 38 is formed in the inner periphery of the bore 36 for the reception of the improved fluid sealing member hereinafter more fully described.

Radially extending passages 40 and 42 are formed in the wall of the head 24 at the opposite sides of the bore 30 leading into the chambers 32 and 34, respectively. The passages 40 and 42 are screw threaded to receive hose connector fittings 44 and 46, respectively. Fitting 44 is adapted to be connected to a fluid supply line and fitting 46, to a fluid exhaust conduit, not shown.

A knockout plunger in the form of a tubular rod 48, having an annular flange 50 at its inner end, is received in the bores 30 and 36 for axial relative movement therein with the flange 50 normally abutting the shoulder 28. The rod 48 has a radially extending aperture 52 therethrough which is intersected by an axially extending bore 54 through the inner end of the rod 48. The bore 54 is counterbored and internally threaded as at 56.

A tubular member 58 is screw threaded into the counterbored portion of the bore 54 and loosely extends through the bore 12 of the housing 10 to a point adjacent the smaller diameter of the taper 14. Frictionally fitted in the end of the tube 58, adjacent the taper 14 is another tube 60 which projects beyond the end of the tube 58. The outer end of the tube 60 is beveled off to provide a point contact as at 62 for engagement with the closed end 64 of a bore 66 in a removable tip 68.

The tip 68 has a closed end portion 70 and a tubular portion 71. The outer periphery of the tubular portion is tapered to correspond with the tapered bore 14 which, when pressed in the bore holds the tip in position. In replacing the tip, it is desirable to provide means for pushing the tip outwardly.

The tube 60 is slidingly adjustable within the tube 58 to accommodate variable lengths of tips. In longer tips, the bore 66 is of greater length and since it is important to have the end 62 at the end of the bore, this adjustment is provided. In assembly, the tube 60 is pulled outwardly and when the tip is inserted, the tube 60 is pushed upwardly in the tube 58 by end contact with the closed end 64. An annular, inwardly extending rib 69 is formed in the wall of the tube 58 for limiting the inward movement of the tube 60.

The improved means for knocking out the tip 68 operates in conjunction with the fluid cooling system and the tubular rod 48. In the form illustrated, a tubular member 72, having an enlarged portion forming a shoulder 74 at its upper end spaced axially from the shoulder 18. The enlarged portion is provided with radially extending apertures 76 communicating with the interior of the tubular member 72 and the outlet chamber 34.

A compression spring 78 surrounds the tube 72 and has its opposite ends in abutting relation with the shoulders 74 and 18 respectively. This spring urges the tube 72 axially with the end face of the enlarged shoulder portion in contact with the lower face of the flange 50, forming a fluid seal between the two fluid chambers 32 and 34. The lower end of the tube 72 is spaced from the upper end of the tip 68. It is to be noted that the spring 78, not only urges the tube 72 into sealing position with the rod 48 but it also urges the rod upwardly and outwardly of the head 24 with the flange 50 forming a seal between the flange 50 and the shoulder 28.

Arranged in the channel groove 38 is the sealing member more clearly illustrated in Fig. 4. The sealing member comprises an annular ring of resilient material 80 which has an integral central rib 82 extending radially inwardly from the ring portion 80. At the opposite sides of the rib 82 are two fiber washers 84 and 86. These washers loosely fit the radial space between the ring and substantially fill the longitudinal space between the lateral edges of the rib 82 and the walls of the channel 38. The fiber washers 84 are radially split as at 88 to permit radial expansion of the washers.

In the form illustrated, the cooling fluid enters the aperture 52 under pressure and flows through the tubes 58 and 60 into the hollow tip 68. The return flow is through tube 72, apertures 76 and discharge fitting 46. Any fluid pressure tending to pass between the walls of opening 36 and the rod 48 would cause a compression of the rib 82 and the lower portion of the ring 80. This axial compression also causes a radial expansion of the upper portion of the ring 80 which causes a radial reduction in diameter of the two upper fiber washers 86 urging the washers and rib 82 into intimate sealing relation with the rod 48. Fig. 4 illustrates the sealing member in its position when a fluid pressure is applied. A packing ring 90 is shown between the connection of the head 24 and body 10.

The rod 48 is guided in its axial movement by the wall of the bore 36 at opposite sides of the sealing means and is also guided by the wall of the bore 30.

When it is desired to replace the tip 78, the outer end of the rod 48 is struck with a tool such as a hammer and the lower end of the tube 72 strikes the upper end of the tubular portion 71 of the tip 68, forcing it out of the taper 14. This action compresses the spring 78 and after the blow, the spring returns the tube 72 and rod 48 to the normal position away from any interference with a new tip to be inserted and into fluid sealing position. By maintaining the fluid seals in sealing position, such as by the seal around the rod 48 in engagement with a definite location on the rod, there is an even wear and the seal becomes adjusted to the rod for more accurate sealing.

The flange 50, seating against the shoulder 28 forms a fluid seal between the inlet and outlet passages to prevent by-passing of any fluid from the inlet passage to the outlet passage without first being conducted to the tip 68. In addition to the spring 78, urging the flange 50 into sealing position, the fluid pressure, acting upon the inner end of the rod 48, urges the flange 50 to sealing position.

While one embodiment of the invention has been illustrated and described, it will be understood that various changes including the size, shape and arrangement of parts may be made without departing from the spirit of my invention as it is not my intention to limit its scope other than by the terms of the appended claims.

I claim:

1. A holder for welding electrode tips, comprising a tubular holder having a socket at one end for frictionally retaining a tip, a head member detachably connected to the opposite end of said tubular holder, said head being tubular and having fluid inlet and outlet ports, a rod projecting through the end of said head movable axially therein and separating the inlet port from the outlet port, an outwardly extending flange on said rod within said head for engagement therewith to limit outward movement of said rod, a tubular member within said tubular holder having one end in contact with the inner end of said rod, said tube being in fluid communication with the outlet port and open at its opposite end, a second tubular member within said first named tube and spaced from the inner wall thereof, said second named tube being carried by said rod and having a fluid communication through said rod to the fluid inlet passage, resilient means for urging said first named tube into contact with said rod for urging the latter outwardly, and fluid sealing means between said rod and head.

2. A holder for welding electrode tips, comprising a tubular holder having a socket at one end, a tip frictionally retained in the socket, a head member detachably connected to the opposite end of said tubular holder, a fluid circulating system within said holder for cooling said holder and tip including a rod projecting through the outer end of said head and a tubular member having one end biased against the inner end of said rod, said rod and said tubular member being adapted to knock out said tip upon inward movement of said rod, a resilient ring positioned within said head and having a central inwardly extending flange of lesser thickness than said ring, and a pair of radially contractible washers at the opposite sides of the flange of said ring forming a seal between said rod and said head.

3. A holder for welding electrode tips, comprising a tubular holder having a socket at one end, a tip frictionally retained in the socket, a head member detachably connected to the opposite end of said tubular holder, a fluid circulating system within said holder for cooling said holder and tip including a rod projecting through the outer end of said head and a tubular member having one end biased against the inner end of said rod, said rod and said tubular member being adapted to knock out said tip upon inward movement of said rod, said rod having three spaced bearing supports, a resilient ring positioned within said head and having a central inwardly extending flange of lesser thickness than said ring, and a pair of radially contractible washers at the opposite sides of the flange of said ring forming a seal between said rod and said head.

4. A holder for welding electrode tips, comprising a tubular holder having a socket at one end, a tip frictionally retained in the socket, a head member detachably connected to the opposite end of said tubular holder, a fluid circulating system within said holder for cooling said holder and tip including a rod projecting through the outer end of said head and a tubular member having one end biased against the inner end of said rod, said rod and said tubular member being adapted to knock out said tip upon inward movement of said rod, an outwardly extending flange at the inner end of said rod for sealing engagement with said head, and resilient means for urging said flange into sealing engagement with said head.

5. A holder for welding electrode tips, comprising a tubular holder having a socket at one end, a tip frictionally retained in the socket, a head member detachably connected to the opposite end of said tubular holder, a fluid circulating system within said holder including a fluid inlet passage and a fluid exhaust passage, a rod projecting through the outer end of said head and extending through the inlet passage into the exhaust passage, a resilient ring positioned within said head and having a central inwardly extending flange of lesser thickness than said ring, a pair of radially contractible washers at the opposite sides of the flange of said ring forming a seal between said rod and said head, and means for sealing the rod against fluid pressure between the exhaust passage and the inlet passage.

6. A holder for welding electrode tips, comprising a tubular holder having a socket at one end, a tip frictionally retained in the socket, a head member detachably connected to the opposite end of said tubular holder, a fluid circulating system within said holder for cooling said holder and tip including a rod projecting through the outer end of said head and a tubular member, resilient means for biasing one end of the tubular member against the inner end of said rod, said rod and said tubular member being adapted to knock out said tip upon inward movement of said rod, an outwardly extending flange at the inner end of said rod for sealing engagement with said head, the inner end of said rod being exposed to the fluid pressure within said holder whereby the fluid pressure urges said flange into sealing engagement with said head, said resilient means urging said flange into sealing engagement with said head.

7. A holder for welding electrode tips comprising a tubular holder having a socket at one end, a tip frictionally retained in the socket, a head member removably attached to the opposite end of said tubular holder, said head having fluid inlet and outlet ports communicating with internal inlet and outlet chambers, respectively, a rod projecting through the end of said head movable axially therein, an outwardly extending flange on the inner end of said rod within the outlet chamber adapted to engage the head and separate the two chambers, a resilient ring positioned within said head adjacent the outer end of said head, a central inwardly extending flange on said ring of lesser thickness than said ring, a pair of radially contractible washers at the opposite sides of the flange forming a seal between said rod and said head, a tubular member within said holder extending from said flange on said rod and terminating at a point adjacent the socket and means for urging said tube into contact with said flange on said rod and said flange on said rod into sealing engagement with said head.

8. A holder for welding electrode tips comprising a tubular holder having a socket at one end adapted to receive a welding electrode tip, a head member removably attached to the opposite end of said tubular holder, said head having a bore therethrough, a fluid inlet chamber adjacent its outer end, an internal groove between said inlet chamber and the outer end, a fluid outlet chamber adjacent its inner end and an internal shoulder in said head separating the chambers, a rod positioned in said bore projecting through the end of said head and extending into the outlet chamber, an outwardly extending flange on the inner end of said rod within the outlet chamber, a tubular member having one end adapted to be biased against the flange on said rod, resilient means urging said tubular member against the flange on said rod and said flange on said rod into sealing engagement with said shoulder, a resilient ring positioned within said internal groove, a central inwardly extending flange on said ring of lesser thickness than said ring, and a pair of radially contractible washers at the opposite sides of the flange on said ring forming a seal between said rod and said head.

9. In a holder for welding electrode tips including a tubular holder, a head member removably attached to one end of the tubular holder and a rod projecting through the end of said head, sealing means between said head and said rod comprising a resilient ring positioned within and adjacent the outer end of said head, a central inwardly extending flange on said ring of lesser thickness than said ring and a pair of radially contractible washers at opposite sides of the flange on said ring.

ERNEST W. HUEBNER.

REFERENCES CITED

The following references are of record in the file of this patent:

UNITED STATES PATENTS

| Number | Name | Date |
| --- | --- | --- |
| 2,385,108 | Seeloff | Sept. 18, 1945 |